United States Patent
Adkins

[15] 3,677,235
[45] July 18, 1972

[54] ROTARY ENGINE

[72] Inventor: Murray R. Adkins, 1140 Pecan Circle, Rock Hill, S.C. 29730

[22] Filed: Nov. 12, 1970

[21] Appl. No.: 88,837

[52] U.S. Cl. .................... 123/8.35, 123/8.43, 418/262
[51] Int. Cl. ........................................ F02b 53/00
[58] Field of Search ............... 123/8.09, 8.27, 8.45, 8.47, 123/43, 43 A, 43 AL, 43 B, 43 C, 8.17, 8.35, 8.43; 418/262

[56] References Cited

UNITED STATES PATENTS

| | | | |
|---|---|---|---|
| 2,435,476 | 2/1948 | Summers | 123/8.45 |
| 2,121,660 | 6/1938 | Hammers | 123/43 |
| 1,320,182 | 10/1919 | Smith | 123/8.27 |
| 1,225,056 | 5/1917 | Riggs | 123/8.45 |
| 1,349,353 | 8/1920 | Wilber, Jr. | 123/8.35 |
| 1,790,256 | 1/1931 | Wright | 123/8.35 X |

*Primary Examiner*—Allan D. Herrmann
*Attorney*—Parrott, Bell, Seltzer, Park & Gibson

[57] ABSTRACT

A rotary internal combustion engine wherein a plurality of piston members oscillate between a position withdrawn within a generally right circular cylindrical driven member and a position extended outwardly thereof, for cooperation with combustion chamber pockets spaced circumferentially about the driven member in applying force to the driven member at the extreme outer periphery thereof. Oscillatory movement of the piston members between the withdrawn and the extended positions proceeds under cam control, while the piston members are returned to a position substantially aligned with the driven member by cooperation with the combustion chamber pockets.

6 Claims, 5 Drawing Figures

INVENTOR:
MURRAY R. ADKINS

BY Parrott, Bell, Seltzer, Park & Gibson
ATTORNEYS

Patented July 18, 1972

INVENTOR:
MURRAY R. ADKINS

BY Parrott, Bell, Seltzer, Park & Gibson
ATTORNEYS

INVENTOR:
MURRAY R. ADKINS

INVENTOR:
MURRAY R. ADKINS

BY Parrott, Bell, Seltzer, Park & Gibson
ATTORNEYS

ROTARY ENGINE

This invention relates to a rotary internal combustion engine, and more particularly to such an engine in which force acting to rotate a generally right-circular cylindrical driven member is applied to the driven member at the extreme outer periphery thereof.

It is an object of the present invention to generate and transmit rotational motive power without necessitating linear reciprocation of a piston or the like, such as is typical of conventional internal combustion engines, through the action of combusting gases against pistons carried by a rotating driven member. In accordance with the present invention, the application of force to the rotating driven member is accomplished in a particularly favorable manner, by direction of the force against pistons at the extreme periphery of the driven member. As a result, forces acting on the driven member act at the greatest possible radial distance from the rotational center thereof, creating the most favorable torque and power conditions available.

Yet another object of the present invention is the cam controlled oscillation of piston members to an intake position and to a combustion position in timed relation to rotation of a driven member which carries such piston members in movement relative to an enclosing casing means having combustion chamber pockets which receive the piston members while the same are in the extended combustion position. In accordance with the present invention, return of the piston members to a position substantially aligned with the driven member is accomplished through cooperation of the piston members with the particular configuration of the combustion chamber pockets.

Some of the objects and advantages of the invention having been stated, others will appear as the description proceeds, when taken in connection with the accompanying drawings, in which FIG. 1 is a perspective view of a rotary internal combustion engine in accordance with the present invention;

Figure 1:
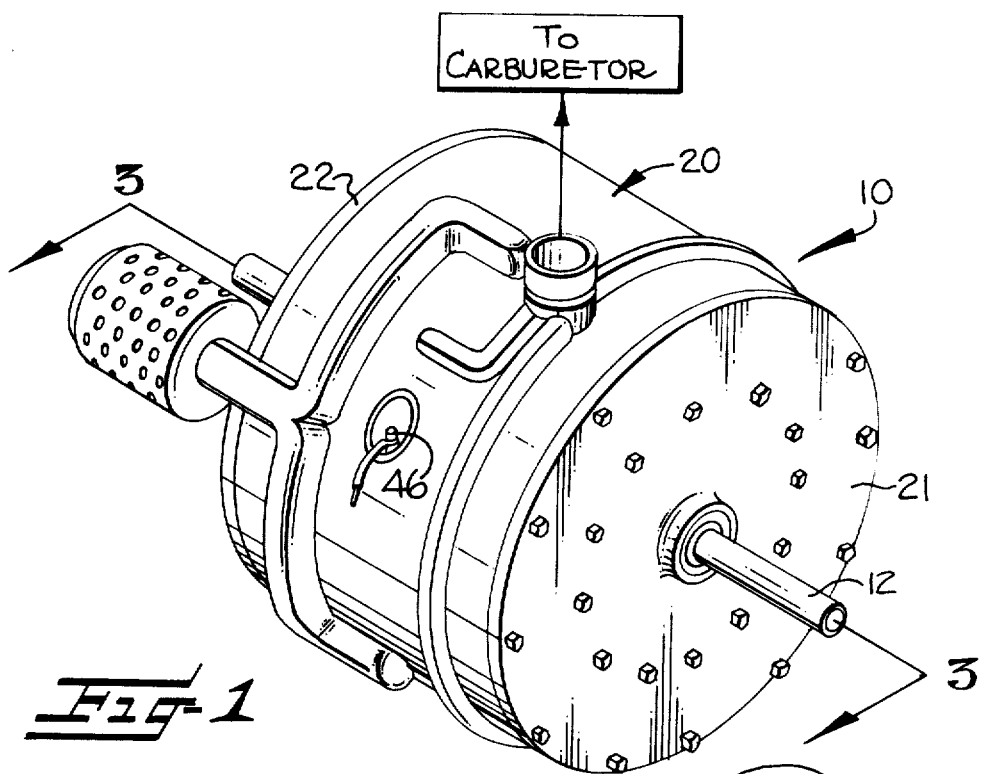
Figure 2:
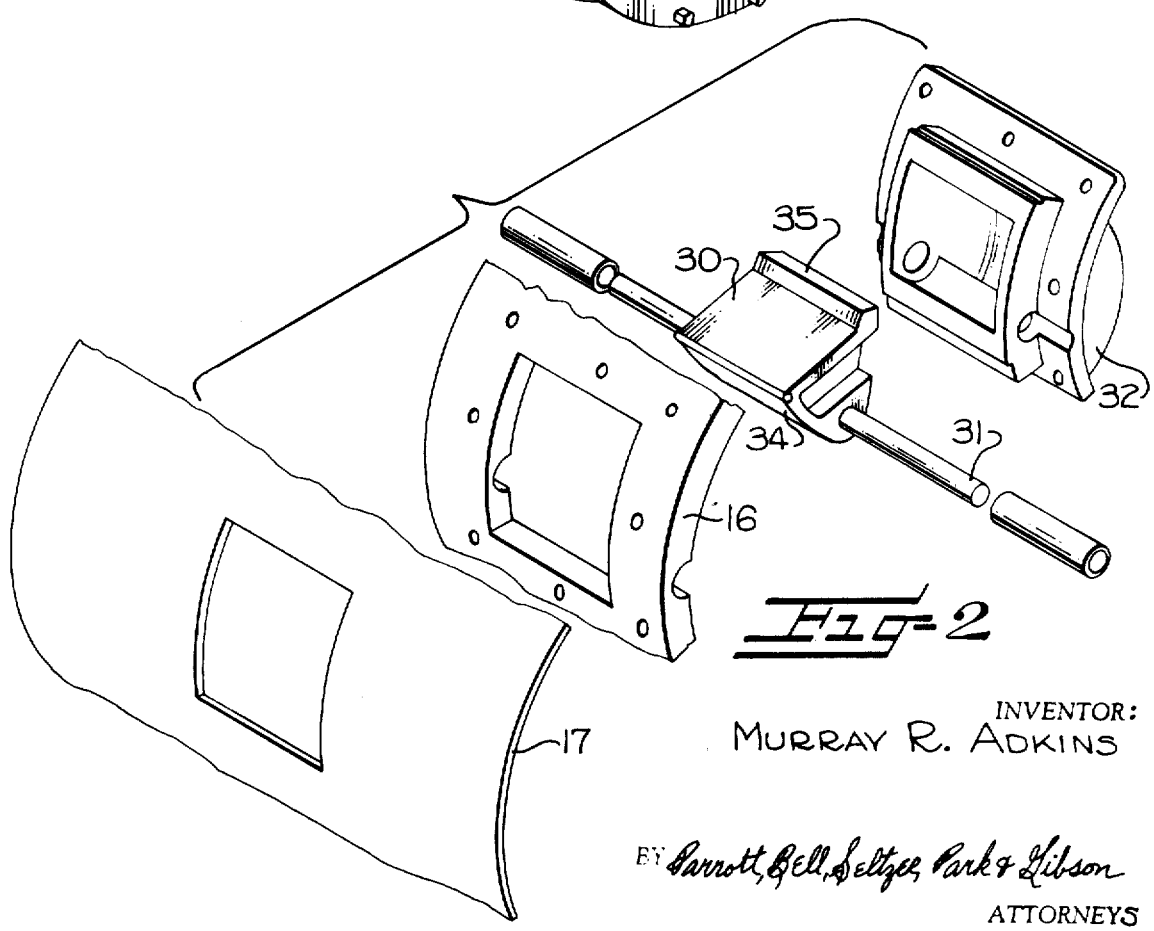
FIG. 2 is an exploded perspective view of certain elements of the engine of FIG. 1.
Figure 3:
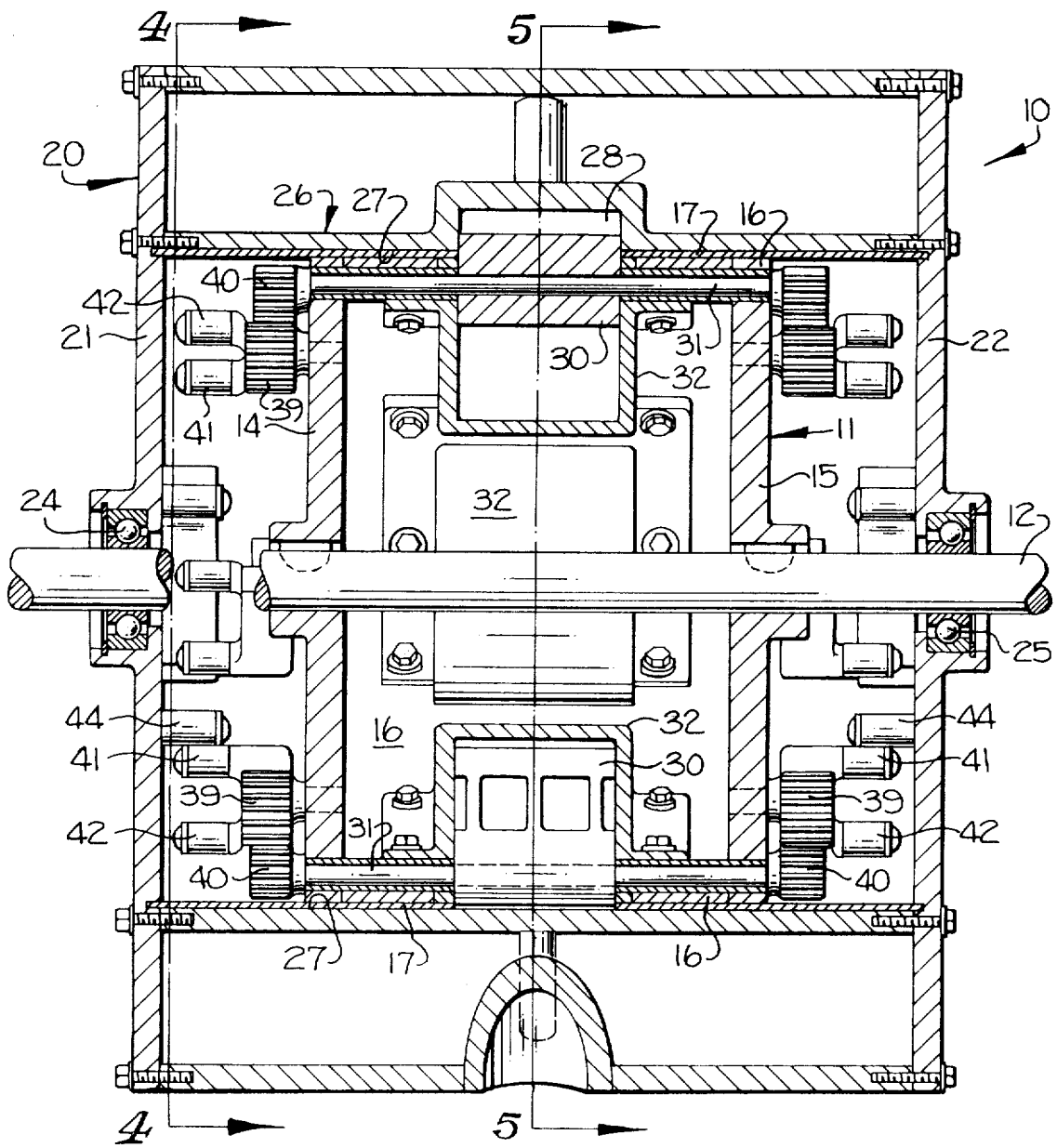
FIG. 3 is an elevation view, in section, through the engine of FIG. 1, taken generally along the line 3—3 in FIG. 1.
Figure 4:
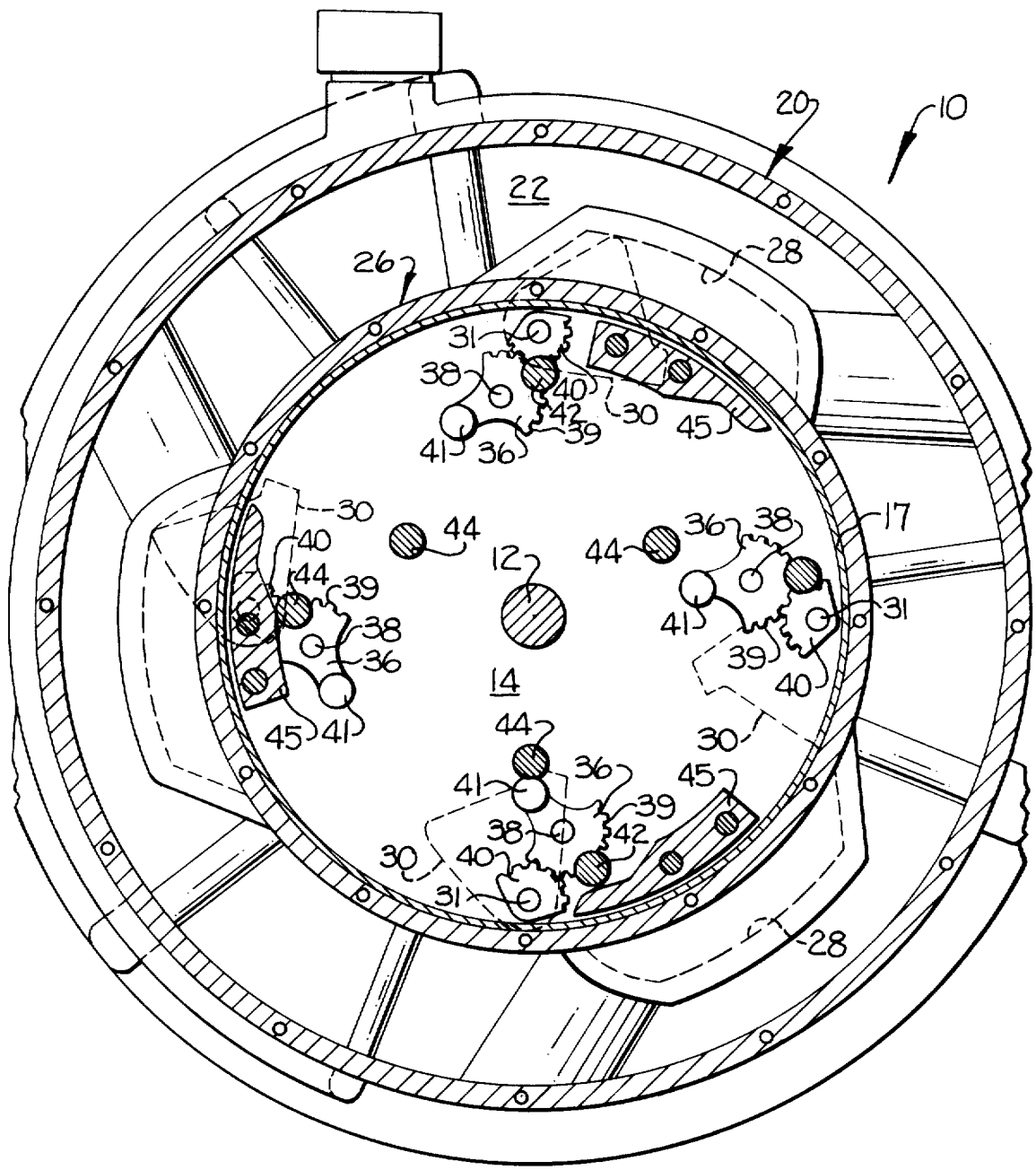
Figure 5:
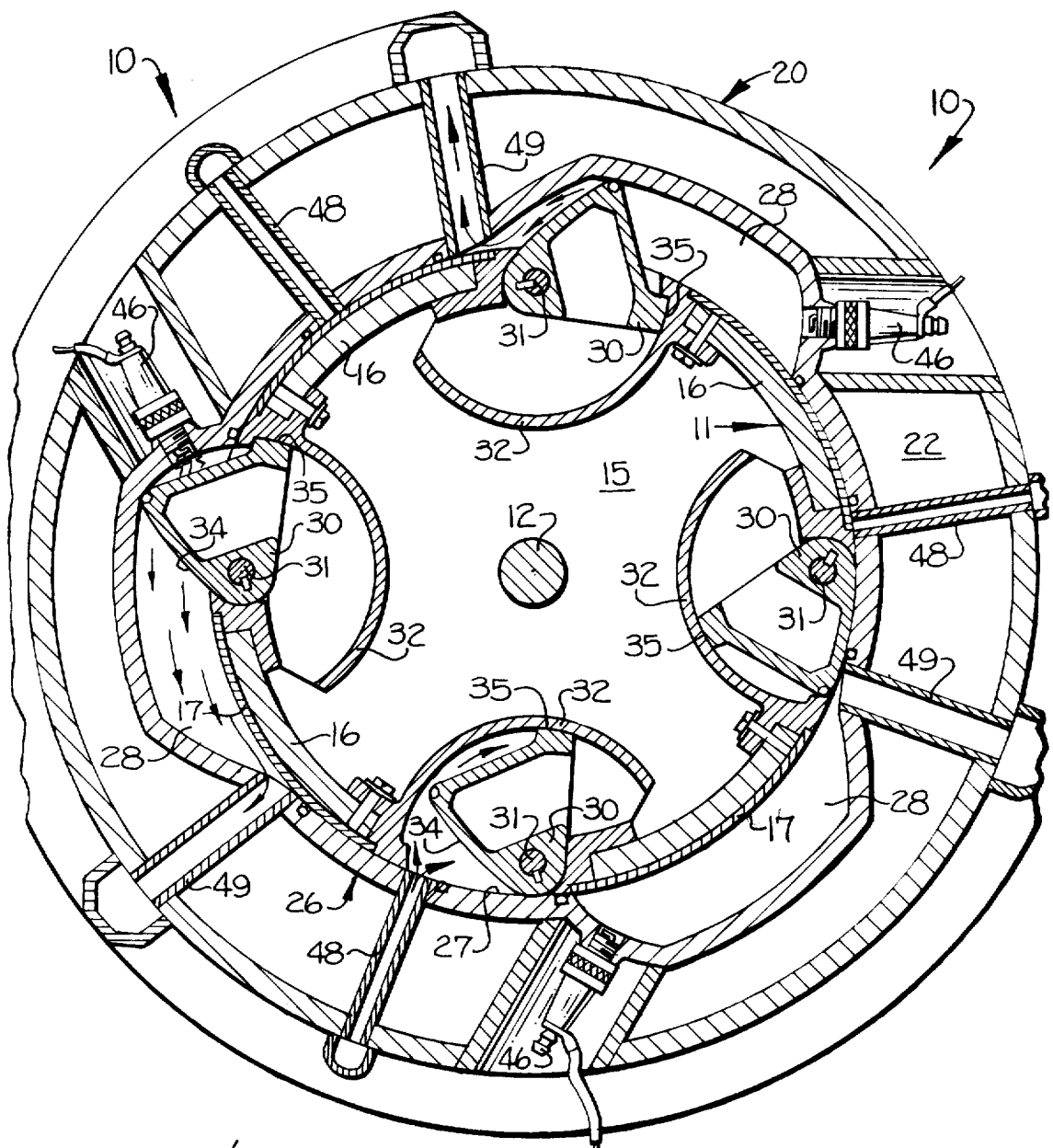

FIG. 4 is an end elevation, in partial section, through the engine of FIGS. 1 and 3, taken generally along the line 4—4 in FIG. 3; and FIG. 5 is a view similar to FIG. 4, taken along the line 5—5 in FIG. 3.

A preferred embodiment for the rotary internal combustion engine of the present invention is particularly illustrated in the accompanying drawings, and is identified generally by the reference character 10. In accordance with the present invention, the engine 10 includes a generally right circular cylindrical driven member 11 (FIGS. 3 and 5) preferably fabricated from a power shaft 12, a pair of side plates 14, 15 and a peripheral member 16 bearing a facing plate 17. By means of the power shaft 12, the generally right circular cylindrical driven member 11 transmits motive power to drive any suitable power consumming load which requires a prime mover, such an automobile or a portable electrical generator.

In accordance with the present invention, the driven member 12 is enclosed within casing means generally indicated at 20 and including respective side plate 21, 22. The side plates 21, 22 receive suitable bearings 24, 25 which engage the power shaft 12, so that the casing means 20 supports the driven member 11 for rotation about a central axis thereof.

The casing means 20 further includes a liner means 26, which defines a right circular cylindrical interior wall surface 27 (FIG. 5) and a plurality of combustion chamber pockets 28 spaced about the circumference of the interior wall surface 27. The combustion chamber pockets 28 have a predetermined depth radially outwardly of the wall surface 27 and a predetermined cross-sectional configuration, as indicated in FIGS. 3 and 5. In particular, the combustion chamber pockets 28 are configured to receive a plurality of piston members 30 mounted in the driven member 11 for rotation therewith about the central axis defined by the power shaft 12. As best illustrated in FIGS. 4 and 5, the number of piston members 30 provided is one greater than the number of combustion chamber pockets 28, for reasons which will be pointed out hereinafter. Each of the piston members 30 is mounted for individual oscillation about a corresponding axis parallel to and spaced from the central axis of the driven member 11, through means of corresponding piston shaft 31. Preferably, for ease and fabrication and to reduce the rotating mass involved, the piston members 30 have a hollow interior reinforced by webs therewithin and the piston shafts 31 pass through reinforcing mounting members 32 bolted to the interior of the peripheral member 16.

The piston members 30 are provided with surfaces of particular configurations for cooperation with the structure of the mounting members 32 and the combustion chamber pockets 28, as will be disclosed more fully hereinafter. In particular, each of the piston members 30 has arcuate outer surface 34 formed on a radius corresponding to that of the driven member 11. When mounted for pivotal movement about the mounting shaft 31, the piston 30 may be moved into such a position that the arcuate outer surface 34 is in substantial alignment with the outer surface of the driven member 11, as defined by the wear surface member or facing plate 17. The piston members 30 also each have sealing abutment portions 35 which engage the mounting members 32 during pivotal movement of the piston members 30 to seal against possible escape of gases past the piston members 30.

In accordance with the present invention, movement of each piston member 30 to a withdrawn position and to an extended position is effected by the operative interconnection with the piston shaft 31 of a corresponding oscillating lever member 36 mounted for pivotal movement about a mounting stub shaft 38 (FIG. 4). Each lever member 36 includes a toothed pinion portion 39 meshing with a part-circular pinion 40 which is fixed to a corresponding piston shaft 31. Upon oscillation of the pinion member 40 about the axis defined by the piston shaft 31, the piston member 30 is moved to corresponding positions.

Each oscillating lever member 36 includes first and second cam engaging stub portions 41, 42. As illustrated in FIG. 3, the stub portions 41, 42 provide first and second cam engaging surfaces for engaging cam means and driving the lever member 36 in oscillation.

In particular, first cam means in the form of a plurality of cam stubs 44 are arranged for engagement with portions of the lever member 36 (as indicated in the lower portion of FIG. 4) for oscillating the piston members 30 into a withdrawn, intake position (illustrated in the corresponding portion of FIG. 5). Following such oscillation of a piston member 30 to the intake position, and with further rotation of the driven member 11, the opposite end portion of the oscillating lever member 36 engages one of a plurality of arcuate cam tracks 45 (as illustrated for example in the left-hand portion of FIG. 4) for pivoting a piston member 30 into an extended, combustion position. In accordance with an important feature of the present invention, the extended, combustion position of the piston member 30 positions the piston with substantial portions thereof outside the driven member 11 and adjacent a leading end portion of a combustion chamber pocket 28. As pointed out more fully hereinafter, such outward pivoting of a piston member 30 compresses a combustible mixture between the piston member 30 and a wall of the combustion chamber pocket 28, adjacent an ignition device such as a spark plug 46. The combustible mixture may then be ignited by a spark from the spark plug 46, by a hot wire such as a glow plug, or by other suitable equivalent igniter means, with combustion giving rise to forces which act on the driven member 11 at a distance from the shaft 12 greater than the radius of the driven member 11. Thus, forces derived from combustion in the engine of the present invention act on a moment arm of the greatest practicable length, to most efficiently develop the torque and rotational motive power available from combustion of the combustible mixtures.

In the cycle of operation of the rotary internal combustion engine in accordance with the present invention, a piston member 30 will from time to time assume the various positions illustrated by the four piston members shown in FIG. 5. In cooperation with such movement of a piston member 30, a plurality of intake passages each opening through the wall surface 27 at a location spaced in predetermined manner relative to a corresponding combustion chamber pocket supply combustible mixture in coordination with withdrawal of the piston members into the driven member 11. As indicated in FIG. 1, combustible mixture for the intake passages may be derived from any suitable carburetor means, through the use of appropriate fuels such as gasoline, propane or the like.

Products of combustion are swept from combustion chamber pockets through a plurality of exhaust passages 49, each opening through the wall 27 immediately adjacent a tapering trailing wall portion of a corresponding combustion chamber pocket 28.

With rotation of the driven member 11 so as to pass a piston member 30 adjacent to intake passage 48, the piston member 30 is withdrawn into the driven member 11 to provide suction pulling combustible mixture into a volume defined between withdrawn piston member 30 and the wall surface 27. Such charge of combustible mixture is subsequently compressed and admitted into a combustion chamber pocket 28 upon movement of the piston member 30 into the extended combustion position. Simultaneously with driven movement of the piston member 30 and driven member 11 about the shaft 12, due to forces arising during combustion of the combustible mixture, the arcuate surface portion 34 of the piston member 30 sweeps products of combustion from the combustion chamber pocket 28 and into an exhaust passage 49. Further, the arcuate surface 34 engages the curved trailing end surface of the combustion chamber pocket 28, to pivot the piston member 30 into a position where the arcuate surface 34 is substantially aligned with the driven member 11, thereby preparing the piston member 30 for passage adjacent the next subsequent intake passage.

In the drawings and specification, there has been set forth a preferred embodiment of the invention, and although specific terms are employed, they are used in a generic and descriptive sense only and not for purposes of limitation.

What is claimed is:

1. A rotary internal combustion engine comprising:
   a generally right circular cylindrical driven member for transmitting motive power,
   casing means enclosing said driven member and supporting said driven member for rotation about a central axis thereof, said casing means including liner means for defining a right circular cylindrical interior wall surface and at least one combustion chamber pocket spaced about the circumference of said wall surface, said combustion chamber pocket having a predetermined depth radially outwardly of said wall surface and a predetermined cross-sectional configuration,
   piston means mounted in said driven member for rotation therewith about said central axis and including a number of piston members one greater than the number of said combustion chamber pockets, each of said piston members being mounted for individual oscillation about a pivot axis parallel to and spaced from said central axis and between a withdrawn intake position within said driven member and an extended combustion position outwardly of said driven member,
   a plurality of oscillating lever cam follower members mounted on said driven member for rotation therewith and for oscillation relative thereto about respective pivot axes parallel to and spaced from said central axis, each of said follower members being operatively connected to a corresponding piston member for imparting oscillatory movement thereto and having first and second cam engaging surfaces,
   first cam means for operative engagement with said first cam engaging surfaces of said follower members and for moving said piston members to said intake position,
   second cam means for operative engagement with said second cam engaging surfaces of said follower members and for moving said piston members to said combustion position,
   said follower members and said cam means cooperating for oscillating said piston members to said intake position and to said combustion position in timed relation to rotation of said driven member relative to said casing means and for thereby withdrawing said piston members prior to movement thereof into alignment with said combustion chamber pockets and extending said piston members into said combustion chamber pockets on movement thereof into alignment,
   intake means for admitting a combustible mixture into a volume defined between a withdrawn piston member and said wall surface,
   ignition means for initiating combustion of combustible mixture swept into said combustion chamber pockets by said piston members, and
   exhaust means for passing from said casing means products of combustion swept from said combustion chamber pockets by said piston members.

2. A rotary internal combustion engine according to claim 1 wherein said first cam means comprises a plurality of cam studs corresponding in number to said combustion chamber pockets, each of said cam studs being mounted from said casing means in predetermined spaced relation to a corresponding combustion chamber pocket.

3. A rotary internal combustion engine according to claim 2 wherein said intake means comprises a plurality of intake passages each opening through said wall surface at a location spaced in predetermined manner relative to a corresponding cam stud and combustion chamber pocket for supplying combustible mixture in coordination with withdrawal of said piston members into said driven member.

4. A rotary internal combustion engine according to claim 1 wherein said second cam means comprises a plurality of arcuate cam tracks corresponding in number to said combustion chamber pockets, each of said cam tracks being mounted from said casing means in predetermined spaced relation to a corresponding combustion chamber pocket.

5. A rotary internal combustion engine according to claim 1 wherein each of said piston members has an arcuate outer surface formed on a radius corresponding to that of said driven member and is mounted in said driven member for substantial alignment of said outer surface with said driven member and further wherein said combustion chamber pockets having tapering wall portions for moving said piston members from said combustion position to a position wherein said outer surface is aligned with said driven member.

6. A rotary internal combustion engine according to claim 5 wherein said exhaust means comprises a plurality of exhaust passages each opening through said wall surface immediately adjacent one of said tapering wall portions of said combustion chamber pockets.

* * * * *